United States Patent
Yamamoto et al.

(10) Patent No.: US 8,023,735 B2
(45) Date of Patent: Sep. 20, 2011

(54) IMAGE PROCESSING APPARATUS FOR EXTRACTING REPRESENTATIVE CHARACTERISTIC FROM IMAGE DATA AND STORING IMAGE DATA TO BE ASSOCIATED WITH REPRESENTATIVE CHARACTERISTIC

(75) Inventors: Shinobu Yamamoto, Tokyo (JP); Toshihiro Suzuki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 999 days.

(21) Appl. No.: 11/639,713

(22) Filed: Dec. 14, 2006

(65) Prior Publication Data
US 2007/0133907 A1     Jun. 14, 2007

(30) Foreign Application Priority Data
Dec. 14, 2005     (JP) ................ 2005-360531

(51) Int. Cl.
*G06K 9/00*     (2006.01)
(52) U.S. Cl. .................. 382/173; 382/202
(58) Field of Classification Search ............... None
See application file for complete search history.

(56) References Cited

U.S. PATENT DOCUMENTS

| | | | |
|---|---|---|---|
| 6,115,717 A * | 9/2000 | Mehrotra et al. ............ 1/1 |
| 6,493,467 B1 * | 12/2002 | Okuda et al. ............ 382/260 |
| 6,606,408 B1 * | 8/2003 | Kang et al. ............ 382/164 |
| 6,711,287 B1 | 3/2004 | Iwasaki | |
| 2003/0044068 A1 * | 3/2003 | Kagehiro et al. ............ 382/182 |
| 2006/0026524 A1 * | 2/2006 | Ma et al. ............ 715/713 |
| 2006/0039609 A1 * | 2/2006 | Takano ............ 382/190 |
| 2006/0136491 A1 * | 6/2006 | Berkner et al. ............ 707/103 R |

FOREIGN PATENT DOCUMENTS

| | | |
|---|---|---|
| JP | 07192116 A | 7/1995 |
| JP | 09081583 | 3/1997 |
| JP | 2003-178071 A | 6/2003 |

OTHER PUBLICATIONS

Chinese Office Action 2006/101685482 mailed Dec. 21, 2007 (7 pages).
Liu, Zhongwei et al., "Feature-based Image Querying and Retrieval System," Journal of Basic Science and Engineering, vol. 8, No. 1, Mar. 2000 (8 pages).
Japanese Office Action dated Jan. 25, 2011; JP Patent Application No. 2005-360531; 1 pg.

* cited by examiner

*Primary Examiner* — Jingge Wu
*Assistant Examiner* — Tahmina Ansari
(74) *Attorney, Agent, or Firm* — Blakely, Sokoloff, Taylor & Zafman LLP (57) ABSTRACT

Image data is displayed on an image display unit. An information input unit specifies a characteristic extracting range corresponding to the image data. An image-characteristic extracting unit extracts a representative characteristic from the specified range within the image data. The extracted representative characteristic are associated with the image data and stored in a storage device. The representative characteristic associated with the image data are also retrieved when retrieving the image data.

12 Claims, 7 Drawing Sheets

IMAGE PROCESSING APPARATUS FOR EXTRACTING REPRESENTATIVE CHARACTERISTIC FROM IMAGE DATA AND STORING IMAGE DATA TO BE ASSOCIATED WITH REPRESENTATIVE CHARACTERISTIC

PRIORITY

The present application claims priority to and incorporates by reference the entire contents of Japanese priority document, 2005-360531, filed in Japan on Dec. 14, 2005.

BACKGROUND OF THE INVENTION

1. Field of the Invention

The present invention generally relates to an image processing apparatus and particularly relates to an image processing apparatus that stores therein input document image data, retrieves and outputs it as needed.

2. Description of the Related Art

Typically, there is a method that, when a user checks stored data in a system of inputting and storing image data, and retrieving stored image data as needed, information such as a title, date, registrant, and file size is displayed as a list. There is another method in which data can be selected by intuition by use of a reduced image such as a thumbnail. However, when a reduced image is used, images that are apparently similar in structure can not be distinguished. As a method of addressing this problem, there is a method of extracting a specific characteristic (here, referred to a representative characteristic) when inputting image data and adding the representative characteristic as attribute information. According to the method, part of image data can be used instead of a reduced image to more specifically display contents of image. Therefore, ambiguity among images when using reduced images can be distinguished. An example of a conventional technology associated with the method is cited as follows.

In "document management system" disclosed in Japanese Patent Application Laid-open No. 2003-178071, document images can be classified in an efficient manner by extracting an area image of a figure or a photograph and using it as an attribute. When an image receiving sub-unit receives a document image, an area discriminating sub-unit performs area discriminating processing of the document image. An image cutting sub-unit classifies a figure area or a photograph area as "figure area" among a sentence area, a table area, lines, a figure area, a photograph area and the like divided by the area discriminating sub-unit and cuts a partial image of such area. A document image managing sub-unit adds the cut partial image as attribute information to management information of the document image and stores the image in a document image storing sub-unit. The image cutting sub-unit, when there exist plural figure areas or photograph areas in the input document image, can cut all of the figure areas as partial areas or cut a representative figure area or photograph area as a partial area among these figure areas or photograph areas.

However, the conventional image characteristic extracting method has the following problem. To extract and display a characteristic of image data is required in a digital multifunction product having a display unit; however, a digital multifunction product does not include a powerful computing unit such as a personal computer. Therefore, when processing is performed to discriminate area information with respect to the whole image data, the resulting heavy load may cause processing to take a long time. Even if an image processing apparatus is implemented in a digital multifunction product that has a powerful computing unit, it is desirable that the processing load is small. The whole image data may include plural figures or photographs, possibly mixed with noise, and an error occurs that an unexpected area can be extracted.

SUMMARY OF THE INVENTION

An image processing apparatus is described. In one embodiment, the image processing apparatus comprises a display unit to display image data; a range specifying unit that specifies a range corresponding to the image data; a characteristic extracting unit that extracts a representative characteristic from image data within specified range among the image data; a storing unit that stores extracted representative characteristic associated with the image data; and a display controlling unit that controls to display the representative characteristic associated with the image data when retrieving the image data for displaying the image data on the display unit.

DETAILED DESCRIPTION OF THE PREFERRED EMBODIMENTS

According to one embodiment of the present invention, an image processing apparatus includes a display unit to display image data; a range specifying unit that specifies a range corresponding to the image data; a characteristic extracting unit that extracts a representative characteristic from image data within specified range among the image data; a storing unit that stores extracted representative characteristic associated with the image data; and a display controlling unit that controls to display the representative characteristic associated with the image data when retrieving the image data for displaying the image data on the display unit.

According to another embodiment of the present invention, an image processing method includes displaying input image data; specifying a range corresponding to the image data; extracting a representative characteristic from image data within the range specified at the specifying among the image data; storing the representative characteristic associated with the image data; and displaying the representative characteristic associated with the image data when retrieving the image data for displaying the image data.

The above and other embodiments, features, advantages and technical and industrial significance of this invention will be better understood by reading the following detailed description of presently preferred embodiments of the invention, when considered in connection with the accompanying drawings.

Exemplary embodiments of the present invention are explained in detail below with reference to FIGS. 1 to 10.

A first embodiment of the present invention includes an image processing apparatus that specifies a range of extracting a characteristic of a displayed image, extracts coupled components of pixels different from those in a background color in a specified area, integrates adjacent coupled components, extracts the integrated components having the largest area as a representative characteristic, and stores the representative characteristic associated with image data.

Figure 1:
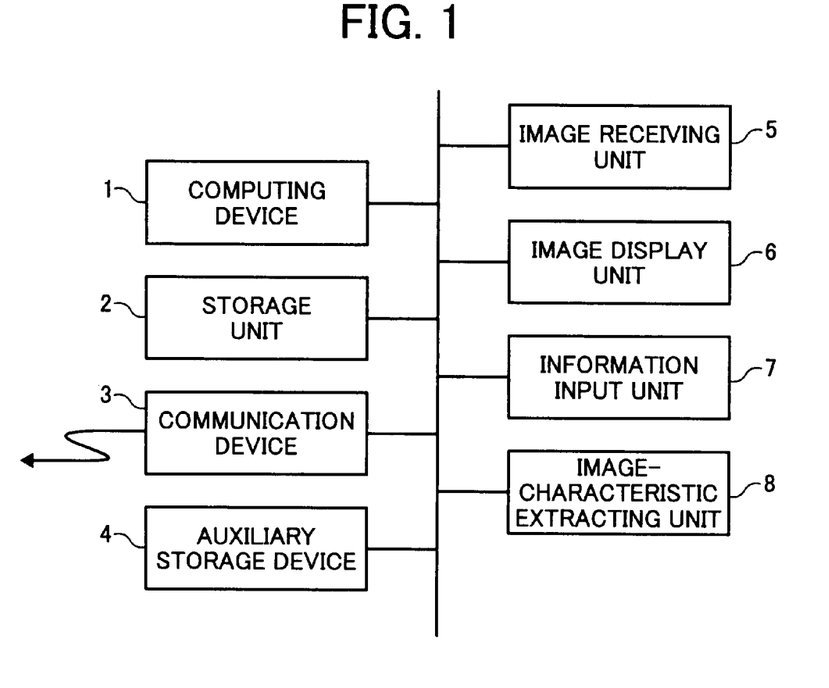
FIG. 1 is a block diagram of an image processing apparatus according to a first embodiment of the present invention.

FIG. 1 is a block diagram of the image processing apparatus according to the first embodiment of the present invention. In FIG. 1, a computing device 1 is a unit that controls the processing operation of the whole apparatus. A storage unit 2 stores data to be processed for the time being. A communication device 3 communicates with outside devices through a network. An auxiliary storage device 4 stores image data and a representative characteristic associated therewith. An image receiving unit 5 is a device such as a scanner that acquires an image. An image display unit 6 is a liquid crystal display and the like that displays received image data or stored image data. An information input unit 7 is a mouse, a touch panel, or the like with which a person can input information of an area or a focus point with respect to image data. An image-characteristic extracting unit 8 extracts a representative characteristic from image data.

Figure 2:
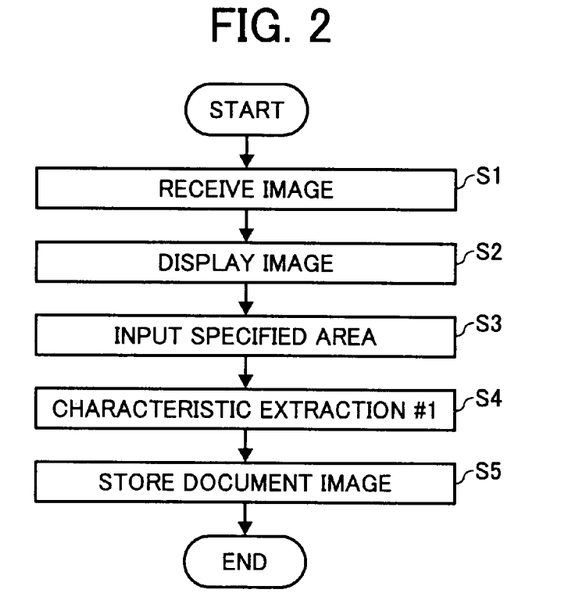
FIG. 2 is a flowchart of a process procedure performed by the image processing apparatus shown in FIG. 1.
Figure 3:
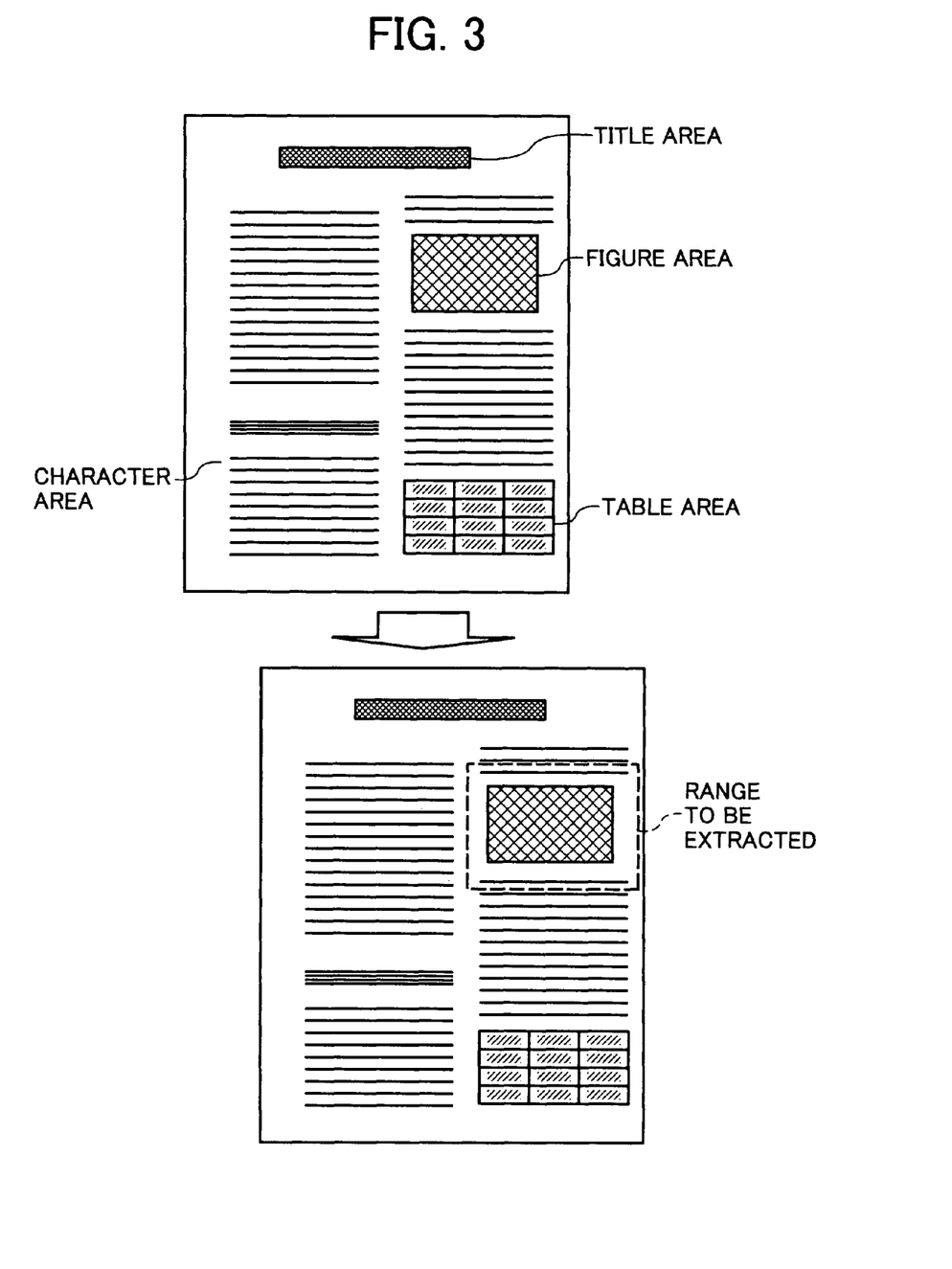
FIG. 3 is a schematic illustrating specifying a range for extracting a representative characteristic.
Figure 4:
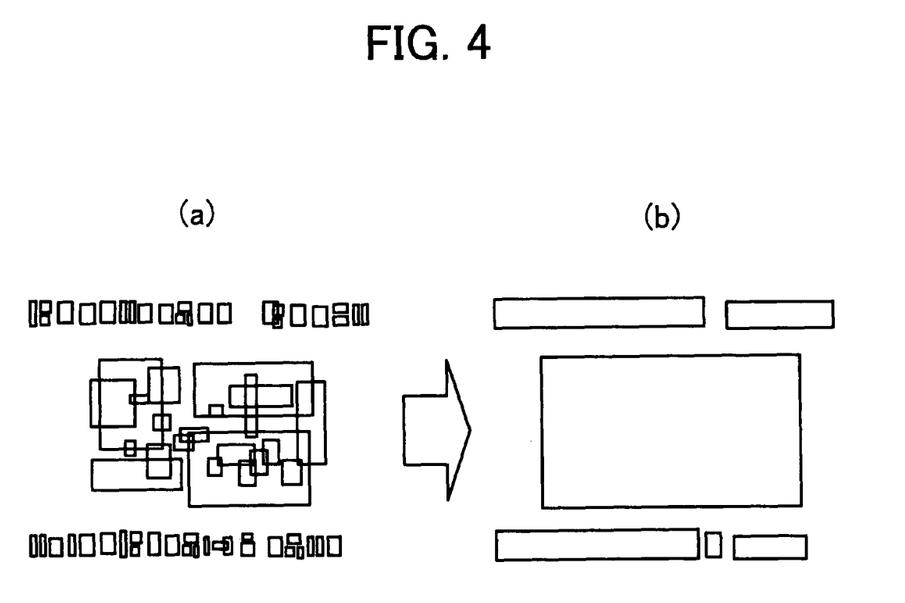
FIG. 4 is a schematic illustrating extraction of a partial area.

FIG. 2 is a flowchart of a process procedure performed by the image processing apparatus shown in FIG. 1. FIG. 3 depicts how to specify a range to extract a representative characteristic. FIG. 4 depicts how to extract a partial area of the representative characteristic.

An explanation is given about the operations of the image processing apparatus constituted as described above according to the first embodiment of the present invention. With reference to FIG. 1, the function of the image processing apparatus is first outlined. The image receiving unit 5 receives or acquires image data. The image data is temporarily stored in the storage unit 2 or the auxiliary storage device 4. The received image data or stored image data is displayed on the image display unit 6 such as a liquid crystal display. Information of an area, a focus point and the like is input to the displayed image data through the information input unit 7 such as a mouse or a touch panel. The image-characteristic extracting unit 8 extracts a representative characteristic from a specified area in image data. Image data and a representative characteristic associated therewith are stored in the auxiliary storage device 4. The communication device 3 can send image data or a representative characteristic outside through the network. Image data can be received through the network. The computing device 1 controls processing operation of the whole image processing apparatus.

With reference to FIGS. 2 and 3, a processing flow is explained. The image receiving unit 5 receives image data at step S1. The image data is displayed at step S2. A user uses the information input unit 7 to specify, as shown in FIG. 3, a range to extract a representative characteristic with respect to the displayed image data at step S3. Then, it is desirable to specify a small range compared with the whole image data to reduce a processing load. At step S4 a partial area of a representative characteristic is extracted in the specified area. This processing is referred to characteristic extraction #1. The detailed explanation thereof is given later on. The image data and the partial area of the extracted representative characteristic are associated with each other to store them at step S5.

With reference to FIG. 4, an explanation is given about how to extract the partial area of the representative characteristic (characteristic extraction #1). First of all, coupled pixels components different from those in a background color are extracted. For example, when a background is white in a binary image, coupled components of black pixels are extracted. Then, adjacent coupled components in a circumscribed rectangle are integrated within a range of a previously prescribed number of pixels to prepare representative characteristic candidates. Among those candidates, a candidate that has the largest area and in which a threshold is equal to or more than a previously prescribed value is extracted as a representative characteristic. A figure and a character string are present in an extracted area in FIG. 4. Coupled components of black pixels are extracted and indicated as in (a) in FIG. 4. Adjacent coupled components are integrated and a characteristic candidate is as shown in (b) in FIG. 4. A candidate located at the center of (b) in FIG. 4 has the largest area, thus the candidate is extracted as a representative characteristic.

A characteristic specified as representative by a user, such as a figure, an area of a photograph, title letters and the like in an area of letters, is often large compared with coupled components in the neighborhood. Thus, large coupled components can be searched in a specified area to easily extract a representative characteristic. To specify a range of searching, without performing characteristic extracting processing over the entire image data, alleviates the processing load and reduces of errors.

In the first embodiment of the present invention, as described above, the image processing apparatus is constituted to specify a characteristic extracting range of a displayed image, extract coupled components of pixels different from those in a background color of the specified range, integrate adjacent coupled components, extract the integrated coupled components having the largest area as a representative characteristic, and store the components associated with image data, thereby enabling to extract a characteristic with a small computing load and with high accuracy.

In a second embodiment of the present invention, the image processing apparatus specifies a characteristic extracting range of a displayed image, divides the specified range into mesh-shaped small areas, calculates a density of pixels that are different from those in a background color and that are included in each small area, finds a small area with a density of pixels that exceeds a previously prescribed threshold, integrates adjacent small areas that have a density of pixels equal to or more than a threshold, extracts the integrated small area having the largest area with a density of pixels equal to or more than a previously prescribed threshold as a representative characteristic, and stores the area associated with image data.

Figure 5:
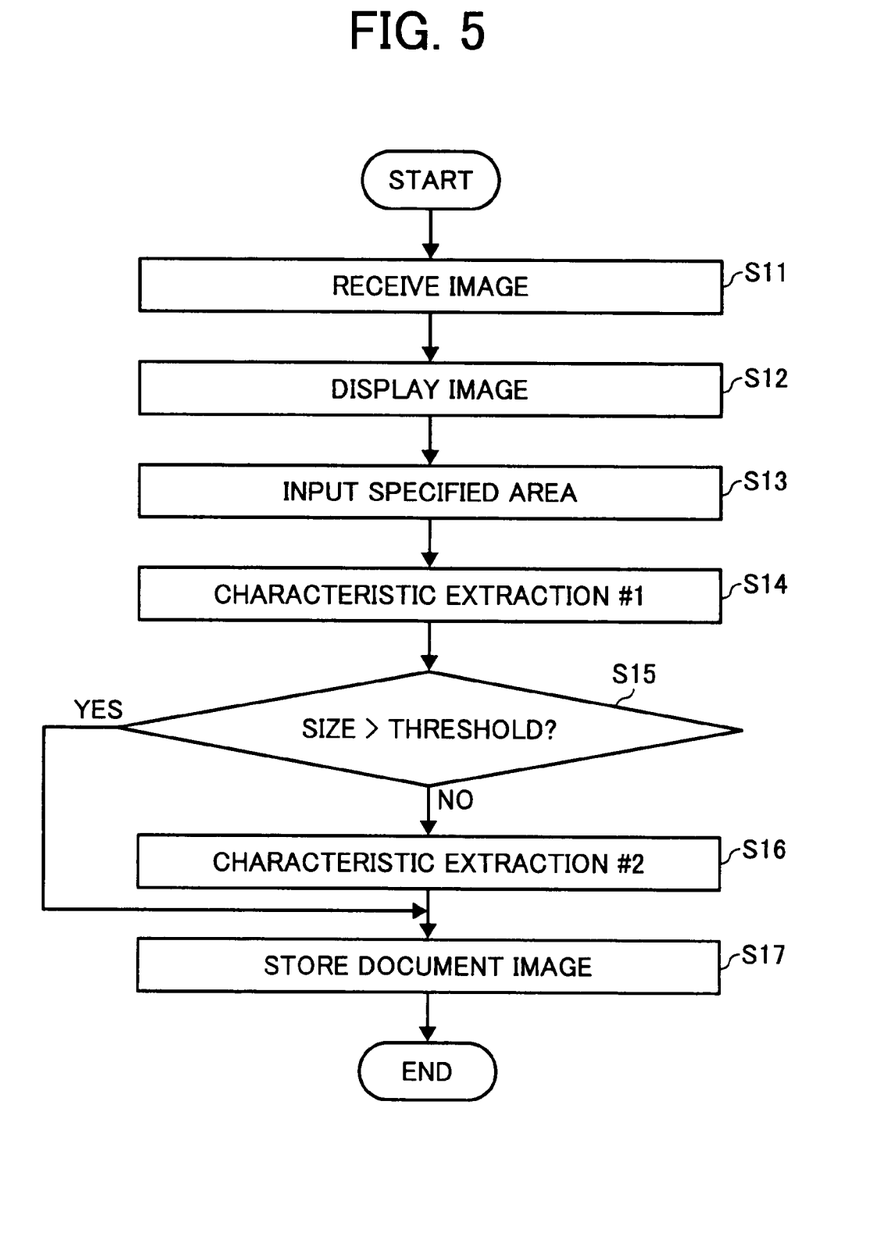
FIG. 5 is a flowchart of a process procedure performed by an image processing apparatus according to a second embodiment of the present invention.
Figure 6:
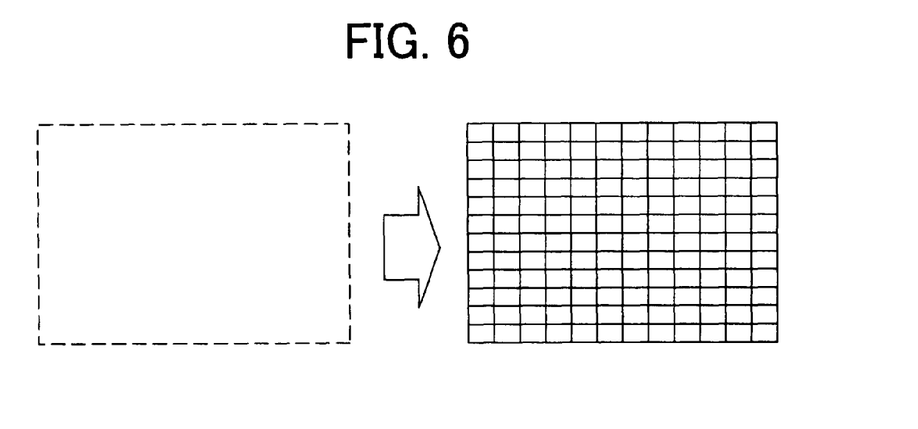
FIG. 6 is a schematic illustrating dividing of a specified area.
Figure 7:
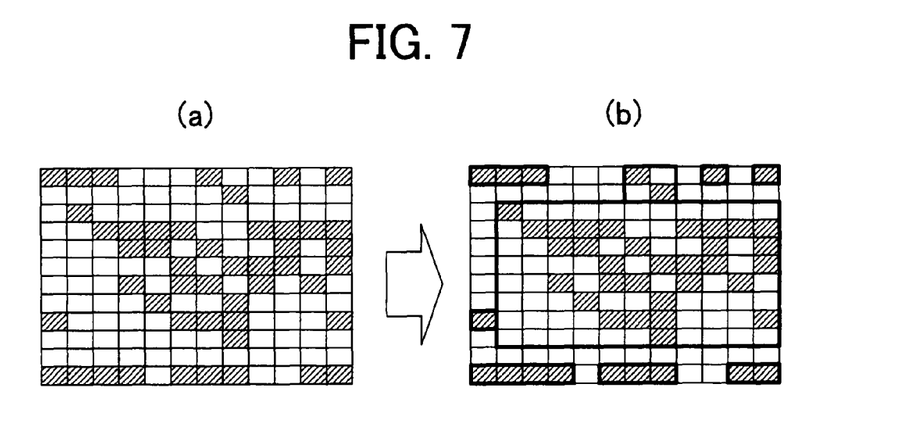
FIG. 7 is a schematic illustrating preparation of a representative characteristic candidate.
Figure 8:
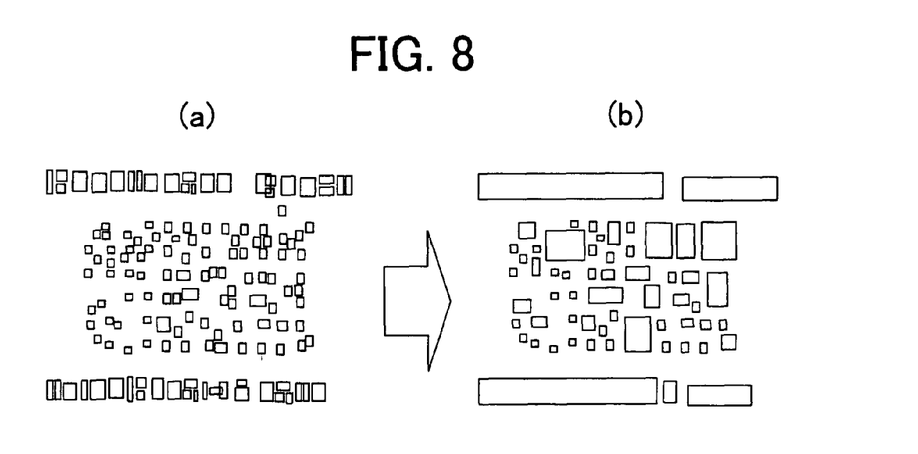
FIG. 8 is a schematic illustrating formation of a set of small coupled components from a figure or a photograph serving as a representative characteristic.

A basic configuration of the image processing apparatus in the second embodiment of the present invention is the same as in the first embodiment. How to extract a partial area as a representative characteristic is different from that in the first embodiment. FIG. 5 is a flowchart of a process procedure performed by the image processing apparatus according to the second embodiment. FIG. 6 depicts how to divide a specified area into mesh-shaped small areas. FIG. 7 depicts how to prepare representative characteristic candidates. FIG. 8 depicts an example that a figure or a photograph serving as a representative characteristic forms a set of small coupled components.

The operation of the image processing apparatus according to the second embodiment of the present invention is explained. With reference to FIG. 5, a flow of processing is first explained. Steps S11 to S14 are the same as steps S1 to S4 in the first embodiment. At step S15, whether the size of a partial area serving as a representative characteristic is larger than the threshold is checked. If the answer is in the affirmative, image data and the extracted partial area as a representative characteristic are associated with each other and are stored at step S17. If in the negative, the partial area as a representative characteristic is extracted based on a second characteristic extracting method (characteristic extraction #2) and is stored associated with the image data at step S17.

With reference to FIGS. 6, 7, the second characteristic extracting method (characteristic extraction #2) is explained. As shown in FIG. 6, the specified area is divided into mesh-shaped small areas. A density of pixels included in each small area that are different from those in a background color is calculated. As shown in (a) in FIG. 7, small areas that have the density of pixels that exceeds the previously prescribed threshold are searched. As shown in (b) in FIG. 7, adjacent small areas whose density of pixels are equal to or more than the threshold are integrated to form representative characteristic candidates. Among the candidates, a candidate in which a threshold is equal to or more than a previously prescribed value and that has the largest area is extracted as a representative characteristic.

In the first embodiment, when a figure or a photograph serving as a representative characteristic forms a set of small coupled components, a representative characteristic may be not correctly extracted shown in FIG. 8. Generally, a character is a combination of lines in which the number of pixels is often small compared with the size of coupled components. In a photograph, however, the number of pixels, which are different from those in a background color, in the size of coupled components is large. The use of a density of pixels enables extraction of representative characteristics with fewer errors with respect to the image data.

As described above, the image processing apparatus according to the second embodiment is constituted to specify a characteristic extracting range of a displayed image, divide the specified range into mesh-shaped small areas, calculate a density of pixels, which are different from those in a background color, included in each small area, search a small area with the density of pixels exceeding a previously prescribed threshold, integrate adjacent small areas with the density of pixels equal to or more than a threshold, extract the integrated areas having the largest area with the density of pixels equal to or more than a previously prescribed threshold as a representative characteristic, and store the areas associated with image data. Thus, it is possible to accurately extract a characteristic with a small calculating load.

According to a third embodiment of the present invention, the image processing apparatus specifies a characteristic extracting range of a displayed image, when an area having the largest area with a density of pixels equal to or more than a previously prescribed threshold can not be extracted as a representative characteristic, extracts an area having a certain size in the specified range as a representative characteristic, and stores the area associated with image data.

Figure 9:
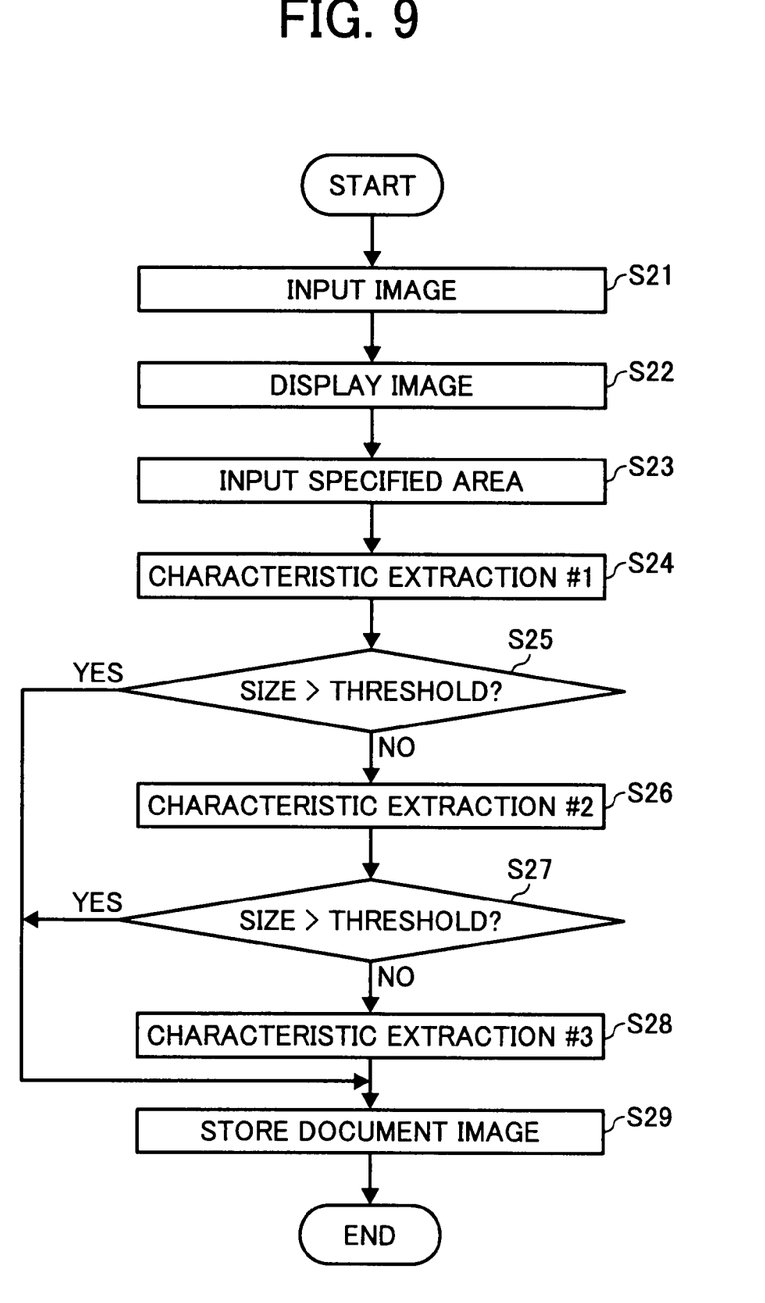
FIG. 9 is a flowchart of a process procedure performed by an image processing apparatus according to a third embodiment of the present invention.

A basic configuration of the image processing apparatus according to the third embodiment is the same as that in the first and second embodiments. How to extract a partial area as a representative characteristic is different from that in the second embodiment. FIG. 9 is a flowchart of a process procedure in the third embodiment.

An explanation is given about the operation of the image processing apparatus according to the third embodiment of the present invention. With reference to FIG. 9, a flow of processing is first explained. Steps S21 to S26 are the same as steps S11 to S16 in the second embodiment. At step S27, whether the size of a partial area as a representative characteristic is larger than the threshold is checked. If in the affirmative, image data and the extracted partial area serving as a representative characteristic are associated with each other to store them at step S29. If in the negative, a partial area serving as a representative characteristic is extracted based on a third characteristic extracting method (characteristic extraction #3) and at step S29, the area is associated with image data for storage.

The third characteristic extracting method (characteristic extraction #3) is explained. An area having a certain size in a specified range is extracted as a representative characteristic based on the third characteristic extracting method. For example, the specified range itself may be extracted or an area having a previously prescribed size at the center of the specified range may be extracted. This method is used when a partial area that serves as a representative characteristic can not be extracted in the first and the second characteristic extracting methods. For example, when the range specified by a user does not include a figure, a photograph, title letters, or the like serving as a representative characteristic, a partial area as a representative characteristic cannot be extracted. A representative characteristic in the third characteristic extracting method is cut-off part of image data. Thus, even when it is impossible to extract a partial area in the first and the second characteristic extracting methods, a representative characteristic can be associated with image data.

As described above, the image processing apparatus according to the third embodiment is constituted to specify a characteristic extracting range of a displayed image, when an area having the largest area with a density of pixels equal to or more than a previously prescribed threshold can not be extracted as a representative characteristic, extract an area having a certain size in the specified range as a representative characteristic, and store the area associated with image data. Thus, it is possible to extract a characteristic with a small calculating load.

The image processing apparatus according to a fourth embodiment of the present invention specifies a point in a displayed image, regards a certain range about the point as a characteristic extracting range, extracts coupled components of pixels in the specified range that are different from those in a background color, integrates adjacent coupled components, extracts the components having the largest area as a representative characteristic, and stores the components associated with image data.

Figure 10:
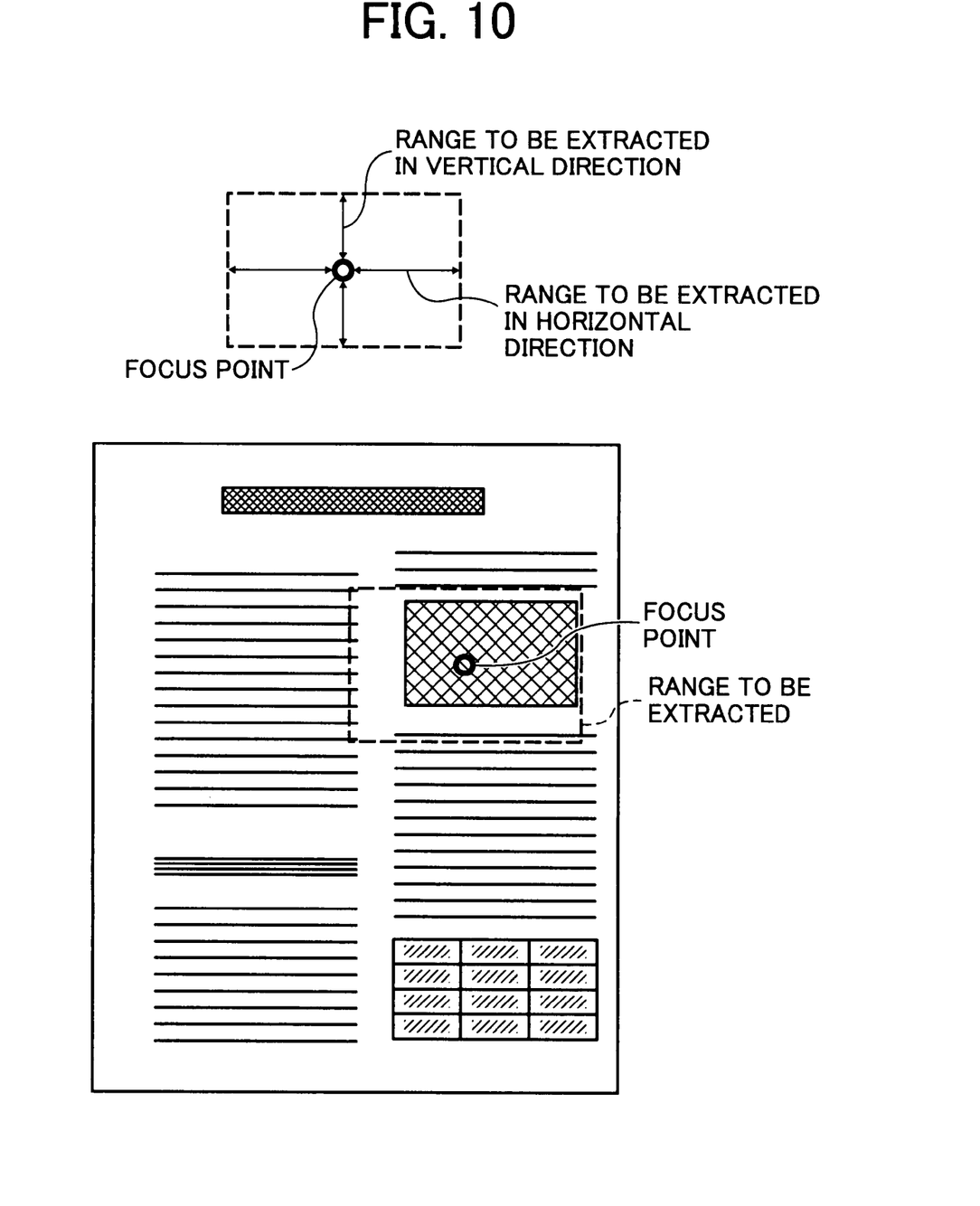
FIG. 10 is a schematic for specifying a range for extracting a characteristic.

A basic configuration of the image processing apparatus according to the fourth embodiment is the same as that in the first embodiment. How to specify a characteristic extracting range is different from that in the first embodiment. FIG. 10 depicts how to specify a characteristic extracting range in the fourth embodiment.

The operation of the image processing apparatus in the fourth embodiment of the present invention is explained. Instead of a user specifying a range to extract a representative characteristic as a rectangular area, a point is specified. As shown in FIG. 10, the size of the area to extract a representative characteristic by regarding the specified point as a center is previously prescribed. The user specifies a center point of the range to extract a representative characteristic. There are two methods to specify a rectangular area. One is a method of dragging a diagonal of the rectangular area and the other is a method of tapping two of corners of the rectangular area. When a display input device such as a touch panel to specify a rectangular area is small, it may be difficult to do the operation. In this event, tapping only one point enables an area to be specified and the area can be easily specified through any type of display input device. The operation of tapping one point can be applied to any one of the first to the third embodiments.

In the fourth embodiment, as described above, the image processing apparatus is constituted to specify a point in a displayed image, where a certain range about the point is regarded as a characteristic extracting range, extract coupled components of pixels in the specified range that are different from those in a background color, integrate adjacent coupled components, extract the components having the largest area as a representative characteristic, and store the components associated with image data. Thus, it is possible to extract a characteristic with a small calculating load.

The above configuration enables extraction of a characteristic with a small computing load and with high accuracy by specifying a range to extract a characteristic of an image. As a result, it is possible to easily discriminate stored images and to provide a glimpse at the stored images.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
a display unit to display image data;
a range specifying unit to allow a user to specify a range of the image data displayed on the display unit;
a characteristic extracting unit to extract, as a representative characteristic of the image data, partial data from image data within the range specified by the user;
a storing unit to store the extracted partial data as the representative characteristic associated with the image data; and
a display controlling unit to control displaying the partial data associated with the image data when retrieving the image data for displaying the image data on the display unit, wherein
the characteristic extracting unit extracts coupled components of pixels different from pixels of a background color in the specified range, integrates adjacent coupled components, and extracts the integrated components having the largest area to thereby extract the partial data corresponding to the largest area.

2. An image processing apparatus according to claim 1, comprising:
a display unit to display image data;
a range specifying unit to allow a user to specify a range of the image data displayed on the display unit;
a characteristic extracting unit to extract, as a representative characteristic of the image data, partial data from image data within the range specified by the user;
a storing unit to store the extracted partial data as the representative characteristic associated with the image data; and
a display controlling unit to control displaying the partial data associated with the image data when retrieving the image data for displaying the image data on the display unit, wherein
the characteristic extracting unit divides the specified range into mesh-shaped small areas, calculates a density of pixels that are different from pixels of a background color and that are included in each small area, finds small areas with a density of pixels that exceeds a prescribed threshold, integrates adjacent small areas with a density of pixels equal to or more than the threshold, and extracts the integrated small area having the largest area with a density of pixels equal to or more than a prescribed threshold to thereby extract the partial data corresponding the largest area.

3. The image processing apparatus according to claim 1, wherein the characteristic extracting unit extracts the partial data corresponding to an area having a certain size in the specified range as a representative characteristic when the integrated components having the largest area cannot be extracted as a representative characteristic.

4. The image processing apparatus according to claim 1, wherein the range specifying unit includes a unit to allow the user to specify a focus point in the displayed image data and regards a certain range near the focus point of the image data as the range specified by the user.

5. An image processing method comprising:
displaying input image data;
allowing a user to specify a range of the image data displayed;
extracting, as a representative characteristic of the image data, partial data from image data within the range specified by the user;
storing the extracted partial data as the representative characteristic associated with the image data; and
displaying the partial data associated with the image data when retrieving the image data for displaying the image data, wherein
the extracting the representative characteristic includes extracting coupled components of pixels different from pixels of a background color in the specified range, integrating adjacent coupled components, and extracting the integrated components having the largest area to thereby extract the partial data corresponding to the largest area.

6. An image processing method comprising:
displaying input image data;
allowing a user to specify a range of the image data displayed;
extracting, as a representative characteristic of the image data, partial data from image data within the range specified by the user;
storing the extracted partial data as the representative characteristic associated with the image data; and
displaying the partial data associate with the image data when retrieving the image data for displaying the image data, wherein
the extracting the representative characteristic includes dividing the specified range into mesh-shaped small areas, calculating a density of pixels that are different from pixels of a background color and that are included in each small area, finding small areas with a density of pixels that exceeds a prescribed threshold, integrating adjacent small areas with a density of pixels equal to or more than the threshold, and extracting the integrated small area having the largest area with a density of pixels equal to or more than a prescribed threshold to thereby extract the partial data corresponding the largest area.

7. The image processing method according to claim 5, wherein the extracting the representative characteristic includes extracting the partial data corresponding to an area having a certain size in the specified range as a representative characteristic when the integrated components having the largest area cannot be extracted as a representative characteristic.

8. The image processing method according to claim 5, wherein the specifying the representative characteristic includes
   allowing the user to specify a focus point in the displayed image data; and
   regarding a certain range near the focus point of the image data as the range specified by the user.

9. The image processing apparatus according to claim 2, wherein the characteristic extracting unit extracts the partial data corresponding to an area having a certain size in the specified range as a representative characteristic when the integrated small area having the largest area with the density of pixels equal to or more than the threshold cannot be extracted as a representative characteristic.

10. The image processing apparatus according to claim 2, wherein the range specifying unit includes a unit to allow the user to specify a focus point in the displayed image data, and regards a certain range near the focus point of the image data as the range specified by the user.

11. The image processing method according to claim 6, wherein the extracting the representative characteristic includes extracting the partial data corresponding to an area having a certain size in the specified range as a representative characteristic when the integrated components having the largest area cannot be extracted as a representative characteristic.

12. The image processing method according to claim 6, wherein the specifying the representative characteristic includes
   allowing the user to specify a focus point in the displayed image data; and
   regarding a certain range near the focus point of the image data as the range specified by the user.

* * * * *